United States Patent [19]

Coren

[11] 4,380,036

[45] Apr. 12, 1983

[54] CLIP-ON PROTECTOR

[76] Inventor: Gerald Coren, 18 Willben La., Plainview, N.Y. 11803

[21] Appl. No.: 292,232

[22] Filed: Aug. 12, 1981

Related U.S. Application Data

[60] Division of Ser. No. 74,885, Sep. 12, 1979, Pat. No. 4,317,153, which is a continuation-in-part of Ser. No. 880,756, Feb. 24, 1978, Pat. No. 4,191,987.

[51] Int. Cl.[3] .............................................. H02H 9/06

[52] U.S. Cl. .................................... 361/119; 361/124; 337/32; 337/34

[58] Field of Search ............... 361/124, 117, 118, 119, 361/120; 337/28, 31, 32, 34, 18

[56] References Cited

U.S. PATENT DOCUMENTS 3,255,330 6/1966 MacKenzie et al. ........... 361/124 X 4,051,546 9/1977 Scheithauer ........................ 361/124

*Primary Examiner*—Patrick R. Salce

[57] ABSTRACT

A clip-on device to protect telephones and communication apparatus, wherein clips for releasably holding a 3-terminal gas protector are external extensions of electrically insulated spaced terminals within the housing. A heat coil in series with each communication line and a carbon block air gap protector across each half of the gas protector for redundancy, are within the housing. The heat coil protects against a sustained overcurrent condition on the line while the gas and air gap protectors ground over-voltages of short duration. Utilizing heat conduction means, heat generated from sustained over-voltage melts a fusible disc allowing spring biased parts within the housing to move and short line terminals to ground.

1 Claim, 4 Drawing Figures

CLIP-ON PROTECTOR

CROSS-REFERENCE TO RELATED APPLICATIONS

This is a division of application Ser. No. 74,885 filed Sept. 12, 1979, now U.S. Pat. No. 4,317,153.

Application Ser. No. 74,885 is a Continuation-In-Part of application Ser. No. 880,756 filed on Feb. 24, 1978 and now U.S. Pat. No. 4,191,987.

BACKGROUND OF THE INVENTION

This invention relates to equipment and methods for protecting apparatus from over-voltage and over-current conditions and is particularly directed to sensitive devices attached to electrical conductors serving various types of apparatus such as used for communication. An example of the protection device's application is the device protecting apparatus from the effects of excessive voltage or current such as might occur because of lightning, a fault, contact by a high tension line and the like.

Of the various types of equipment presently employed for accomplishing the foregoing, each suffers from one or more disadvantages including excessive cost and size, lack of adaptability to existing protector terminals, maintenance difficulties, hazardous conditions during servicing, loss of function in the presence of sustained overload, lack of safety provision thereby permitting the apparatus supposedly under protection to function without a protector, inability to protect apparatus from both high voltage surges and low level voltages which cause sustained currents, and less-than-optimum reliability.

It is an object of this invention to overcome or substantially reduce the foregoing shortcomings and to this end the invention provides improvements in performance, utilization and construction leading to reduction in size and cost, adaptability to existing mounting locations, reduction in hazards, an assurance that the over-voltage protector is installed, ability to utilize the device in a densely packaged area, simplification and safety in servicing, ability to provide protection from both excessive voltage and excessive current, and an increase in reliability. Moreover, in the invention techniques, additional protection features are attained without significantly impairing the essential simplicity of the construction.

The invention consists of the novel methods, processes, parts, steps, combinations and improvements herein shown and described.

BRIEF DESCRIPTION OF THE DRAWING

Serving to illustrate exemplary embodiments of the invention are the drawings of which.

DESCRIPTION OF THE PREFERRED EMBODIMENT

Figure 1:
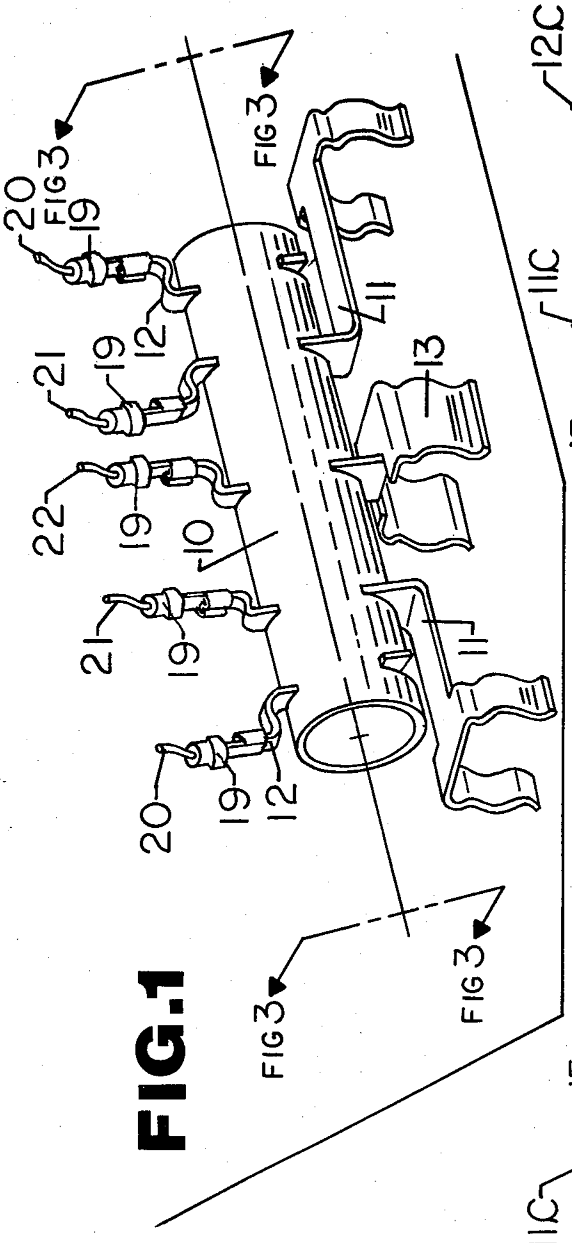
FIG. 1 is an isometric view illustrating the invention.
Figure 2:
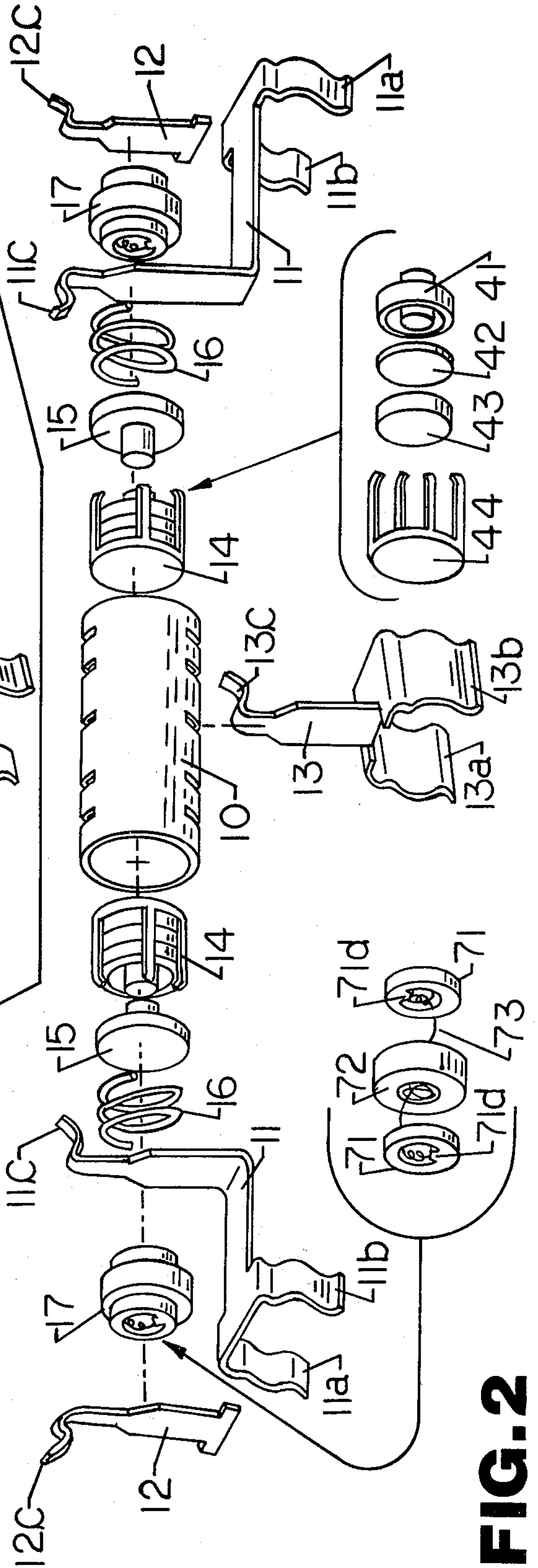
FIG. 2 is the detail view of components within the housing of FIG. 1.
Figure 3:
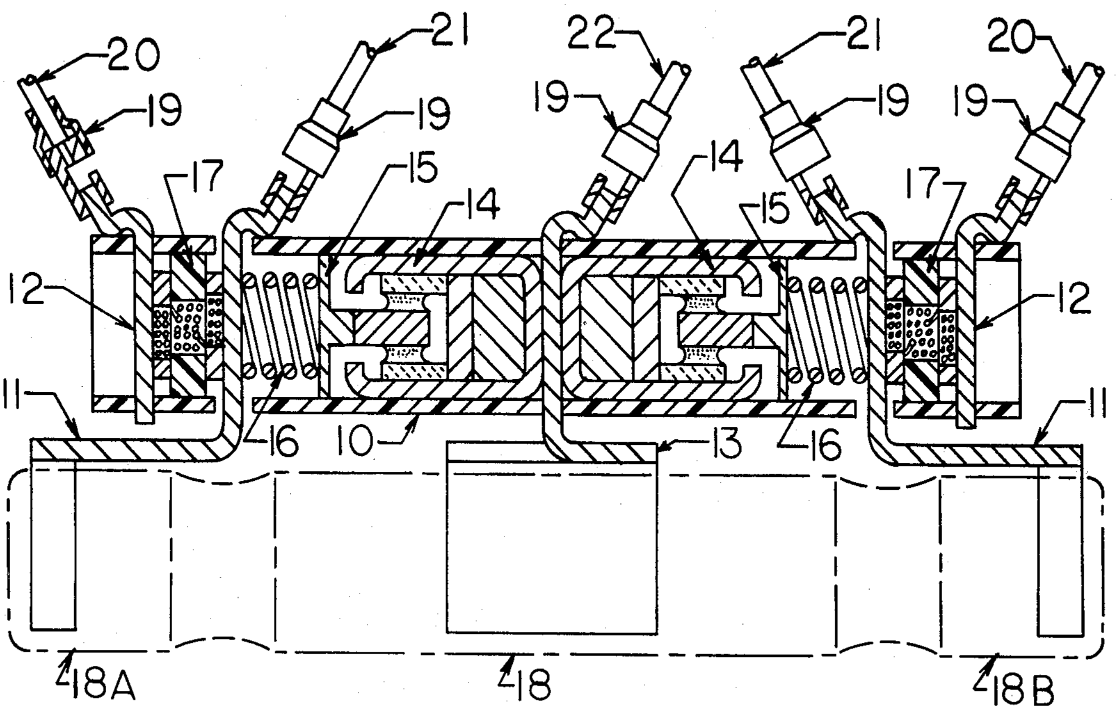
FIG. 3 is a sectional view taken along the line 3—3 of FIG. 1 and looking in the direction of the arrows to reveal the components of the device of FIG. 1.

Referring to the embodiment of FIGS. 1–3, the arrangement therein illustrated comprises a housing 10 constructed of a nonconducting material illustratively shown to be Bakelite and cylindrically shaped. Located in the housing in aligned relationship are two electrical transfer plates 11, two circuit transfer plates 12, one heat transfer plate 13, two air gap assemblies 14, two plungers 15, two springs 16 and two heat coil assemblies 17. The plungers are made of any suitable material such as steel or brass. The plates and springs are made of any suitable material such as beryllium copper or phosphor bronze. Electrical transfer plates 11, circuit transfer plates 12 and heat transfer plate 13 are mounted through slots in the housing and held in place by deforming the connector terminals 11*c*, 12*c* and 13*c* on their respective plates, after installation.

Electrical transfer plate 11 and heat transfer plate 13 each has a pair of spaced blades 11*a*, 11*b* and 13*a*, 13*b* respectively. Each pair of associated blades comprise a holding clip. The holding clips are aligned to receive and hold the over-voltage gas protector 18. In the embodiment illustrated in FIGS. 3–4 this over-voltage gas protector is of known construction; examples of which are an AEI type 16 gas tube protector, a TII-16 type surge arrester, a Siemens type TI-6350 surge voltage arrester. A cartridge of this type comprises a gas-filled housing having a pair of opposed, spaced electrodes each of which makes electrical contact with one of the cartridge and terminals 18A and 18B. In the presence of an excessive voltage the gas between the electrodes is ionized thereby effectively shorting the end terminals and connecting them to the case of the protector and to external ground as described below. The lines and apparatus connected to these electrodes via the electrical transfer plates are thus short-circuited to thereby prevent the over-voltage condition from causing excessive current flow in the protected apparatus.

In the application of this device each of the circuit transfer plates 12 is connected to a different entering line wire 20 of the two line system, each of the electrical transfer plates 11 is connected to a different apparatus wire 21 of the two line system and the heat transfer plate 13 is connected to external ground wire 22. These connections are illustratively accomplished by such means as 'Faston' female connectors 19 manufactured by AMP Co. These are push-on-quick-disconnect receptacles which mate tightly with the connector terminals 11*c*, 12*c*, 13*c* on one end and firmly crimp to different wires 20, 21 and 22 on the other end.

The air gap assembly 14 is illustratively shown to be the same type as used in independently mounted air gap protectors such as manufactured by Cook Electric Co., Western Electric Co., Reliable Electric Co. or Reliance Electric Co.. This assembly contains carbon electrodes although metal electrodes will also suffice. There are two carbon electrodes 41, 42 one fusible disc 43, and a metal cage housing 44. The carbon electrodes are insulated from each other by an air gap which allows the grounding of high voltage surges through the development of an arc path between line carbon electrode 41 and grounded carbon electrode 42. Should these high voltage surges on the line persist, the continued arcing will heat and melt the fusible disc 43, thereby allowing repositioning of components due to urging of spring 16, so that plunger 15 contacts grounded metal cage 44 thereby shorting across the air gap and causing the incoming line and all voltage surges to be grounded. The fusible disc 43 may be lead, solder, babbit or other appropriate material in accordance with ratings and installation requirements, the fusible disc being designed to melt when the current rating of the device is exceeded.

The heat coil assembly 17 is composed of two identical conducting rings 71, an insulating washer 72 and coil wire 73. Suitable material for the conducting ring is steel, brass or copper and for the insulating washer is Bakelite. Each conducting ring is fastened to an opposite face of the insulating washer as by glue, and each ring has a tab 71*d* used to connect by solder means one end of the heat coil wire 73. The heat coil wire 72 is insulated and maintained in place within the center of the heat coil assembly by its own stiffness, the coil wire being designed to open when the current rating of the apparatus wire is exceeded over a predetermined time period, as when a voltage appears which is not large enough to cause arcing of a protector. Since the coil wire is a series element in the incoming line its opening will assure apparatus safety from any excessive current. The coil is not affected by short duration over-voltage surges which produce arcing across the protector.

Figure 4:
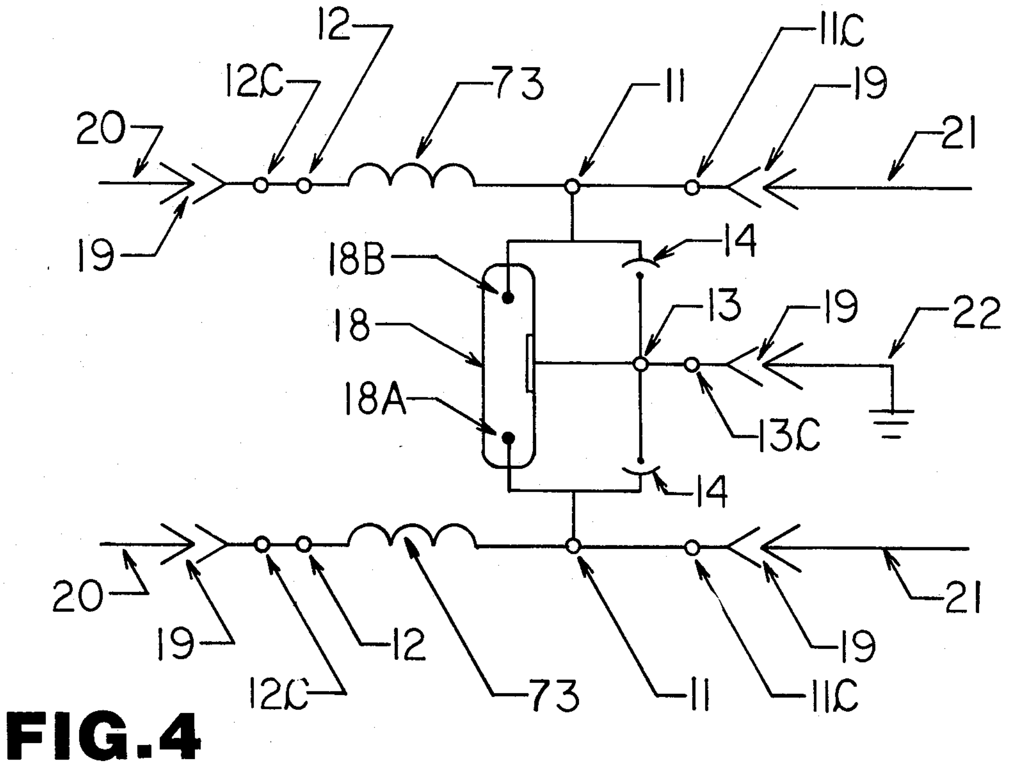
FIG. 4 is a schematic illustration of the inventive device in combination with a gas protector.

In FIG. 4 there is illustrated the combination of an over-voltage gas protector with the device. Under normal operation the signal path is from either one of the wires 20 and its associated connector 19 to one of the terminals 12*c*. It then passes to circuit transfer plate 12 to ring 71, through coil wire 73 to the other ring 71 on the same heat coil assembly where it enters electrical transfer plate 11, connector 19 and wire 21 to the apparatus.

If excessive voltage exists on the line the current developed will be conducted to ground through the path consisting of its associated wire 20 to its connector 19 to its associated circuit transfer plate 12 to ring 71, through coil wire 73 to the other ring 71 on the same heat coil assembly to electrical transfer plate 11 to its associated gas protector end terminal 18A or 18B, then through the gas protector 18 which will ionize, to the protector case, through heat transfer plate 13, the terminals at 13*c*, connector 19 and wire 22 to ground.

As an added measure of reliability a back up path to ground is provided for excessive voltage if the over-voltage gas protector should fail or be removed from the device. With the gas protector 18 inoperable or missing from the device an excessive voltage arriving at electrical transfer plate 11 will pass to spring 16, plunger 15 and line carbon electrode 41. The excessive voltage then arcs across the air gap to grounded carbon electrode 42, to fusible disc 43 to metal cage 44, heat transfer plate 13, terminal at 13*c*, connector 19 and wire 22 to ground.

With gas protector 18 installed and operable an entering excessive voltage can be grounded through either of two parallel paths; one utilizing the gas protector and the other utilizing the carbon electrodes in the air gap assembly. However, the gas protector should conduct first because it can be more accurately set for a lower firing voltage.

In the case of a prolonged over-voltage condition there is a possibility that the gas tube or other protective element will fail. If the element becomes an open conduit the apparatus and lines connected thereto are no longer protected. To eliminate this possibility the embodiment of FIG. 3 includes a shorting arrangement which provides an extra measure of safety and reliability as described hereinafter.

In the event of a sustained excessive voltage the heat generated in the gas protector will be conducted by spaced blades 13*a*, 13*b* of the heat transfer plate 13 to cage 44 and to the fusible disc 43 in air gap assembly 14. As excessive heat melts the fusible disc, its compressed spring 16 expands, pushing plunger 15 towards cage 44. During this movement electrical contact between the plunger and grounded cage is prevented by insulation means within air gap assembly 14. Eventually, when the fusible disc is melted, plunger 15 contacts cage 44 which is in contact with the grounded heat transfer plate 13 thus connecting the incoming line to ground through the path of its associated wire 20, connector 19, terminal 12*c*, circuit transfer plate 12, ring 71, coil wire 73, second ring 71, electrical transfer plate 11, spring 16, plunger 15, cage 44, heat transfer plate 13, terminal 13*c*, connector 19 and wire 22. In the illustrated use of this device there are two fusible discs, each providing similar heat sensitive means and similar grounding means for said excessive voltage. When the gas protector is not in operation these fusible discs function in the same manner as discussed, to ground the incoming line and sustain excessive voltage causing heat to be generated in the carbon electrodes.

An extra measure of assurance that the device is installed may be easily obtained. Since it is possible that the device may be removed from existing terminals it is necessary to provide means whereby it must be replaced. These means consist of a slight wiring rearrangement and a change of wire termination hardware as hereinafter described.

As presently configured, the subscriber station utilizes three screw terminals, one for each line of the two line system and one for ground. For connection purposes bared wires are now wrapped around each terminal and held in place by use of a nut on the screw. Although this clip-on device may be easily adapted to existing subscriber terminals, it is proposed to eliminate the present screw terminals and place female connectors on each of the wires. These connectors were previously described and are shown as item 19 in FIGS. 1, 3, 4. Each of the two incoming lines accepts a connector which is placed on a different terminal 12*c*. Each of the two apparatus wires accepts a connector which is placed on a different terminal 11*c*. The existing grounded wire and the apparatus ground wire accept one common connector which is placed on terminal 13*c*. Through this rewiring additional safety is obtained since the device becomes a series element rather than a parallel element in the use of the apparatus and it becomes impossible for the apparatus to function without the device in its proper place. In addition, ease of maintenance and safety of personnel is provided in the removal and replacement of the device after the fusible disc has melted. Although connector 19 firmly grasps connector terminals 11*c*, 12*c*, 13*c*, it can be disconnected rapidly and safely since connector 19 has insulation on its crimped portion where it may be held without fear of shock as with the present screw terminal connection.

An important aspect of this device is its adaptability to existing terminals of presently utilized protectors, which may be removed from operation due to one or more undesirable deficiencies and may be replaced by this device without major installation costs. This device may be operated across existing circuit terminals which presently utilize an air gap type protector with the air gap protector removed, since safety during prolonged overload is provided by its own fusible element and is not dependent upon the fusible element backup accompanying the independent air gap protector. This small mobile holder for the gas-filled over-voltage protector may be encapsulated with a gas protector using a potting material, Stycast 2651-40 or RTV-21 are suitable examples, with terminals 11*c*, 12*c*, 13*c* left exposed, and may be maneuvered and positioned into place so that it is quickly and easily connected as previously described or by utilizing a connector 19 having a pigtail wire for connection to existing circuit screw terminals. Another important feature of this small device is its adaptability to existing central office equipment presently utilizing densely packaged gas-filled over-voltage protectors which operate without the use of any fusible safety elements, such as in the TII 700 block. One possible minor wiring modification is removing the existing block ground connection at each gas protector case and placing the ground onto connector terminal 13*c* of heat transfer plate 13.

While only one embodiment of the present invention has been shown and described, it is to be understood that many changes and modifications can be made hereto without departing from the spirit and scope hereof.

What is claimed is:

1. A method of assuring multi-mode electrical protection for telephone lines that employ a gas tube arrestor and wherein the method is adapted for use with a device which clips onto the gas tube arrestor by means of metallic fingers that are in thermal and electrical contact with the respective electrodes of the gas tube arrestor, comprising the steps of placing a heat coil assembly in the device which is responsive to a sustained over-current condition and is adapted to open-circuit upon same, placing a common form of terminal means on the device, with the terminal means extending from the periphery of the device, positioning the heat coil assembly between a first one and a second one of the terminal means, placing an over-voltage arrestor in the device with the over-voltage arrestor in pressure engagement with the heat coil assembly thus causing the heat coil assembly to establish electrical continuity with the two terminal means between which it is positioned whereupon removal of the over-voltage arrestor or heat coil assembly from the device operates to break the electrical continuity established between the two terminal means, placing a common form of connector on each incoming line, placing a common form of connector on each apparatus line, the common form of connector that is placed on each incoming and apparatus line being adapted to mate with the common form of terminal means on the device, connecting the common form of connector on an incoming line to one of the two terminal means, and connecting the common form of connector on an apparatus line to the other one of the two terminal means thus establishing electrical continuity between associated incoming and apparatus lines whereby if either incoming or apparatus line is disconnected from its respective terminal means, electrical continuity between the associated incoming and apparatus lines is broken electrically isolating the same.

* * * * *